Nov. 6, 1951 E. F. McCLAIN, JR 2,573,723
PHONOGRAPH STYLUS OF SMALL EFFECTIVE TIP RADIUS
Filed Sept. 30, 1947
FIG. 2A FIG. 2B FIG. 1
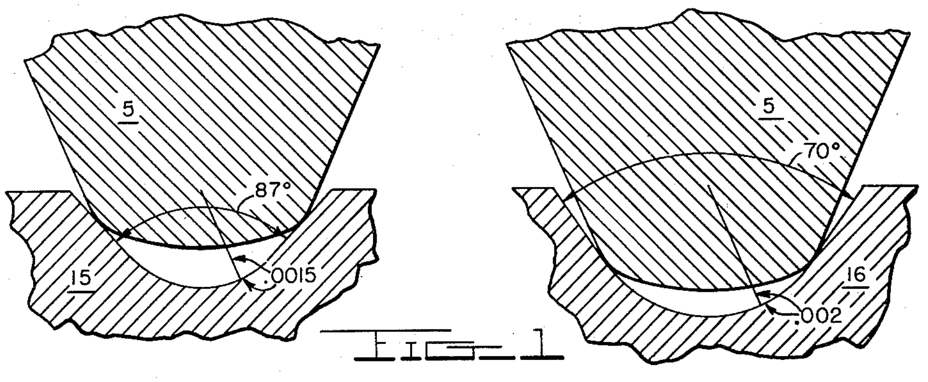
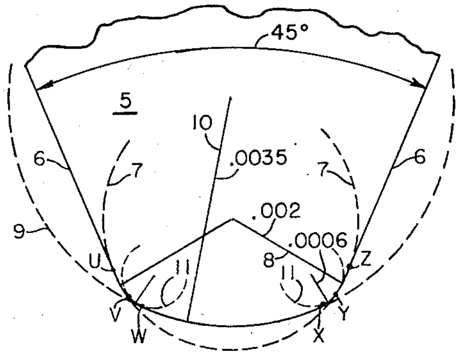
FIG. 2C
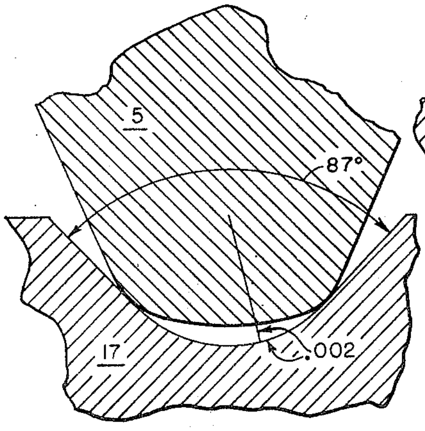
FIG. 2D
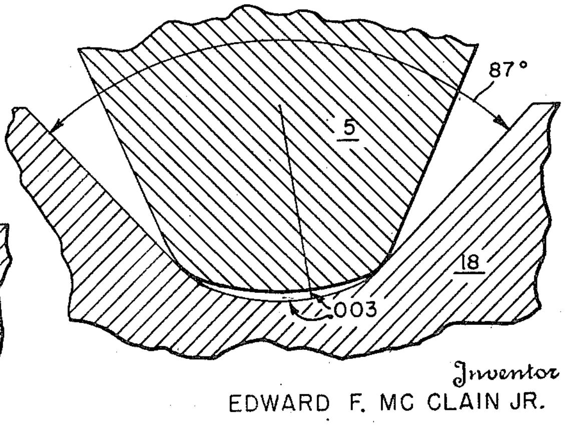
Inventor
EDWARD F. MC CLAIN JR.
By M. Hayes
Attorney Patented Nov. 6, 1951 2,573,723

UNITED STATES PATENT OFFICE 2,573,723

PHONOGRAPH STYLUS OF SMALL EFFECTIVE TIP RADIUS

Edward F. McClain, Jr., Washington, D. C.

Application September 30, 1947, Serial No. 777,098

1 Claim. (Cl. 274—38)

(Granted under the act of March 3, 1883, as amended April 30, 1928; 370 O. G. 757)

This invention relates to reproducing styli for sound transducers and more particularly to a universal stylus having a compound radius of tip.

Owing to the lack of standardization in the art of disc recording, reproduction not limited to the product of a single manufacturer or a single recording system cannot maintain a uniformly high standard of fidelity and freedom from distortion without great duplication of reproducing equipment. Where it is desired to reproduce from both 78 R P. M. type records and 33⅓ R. P. M. type transcriptions these problems are doubled.

Transcriptions commonly in use have a groove shape whose radius of curvature varies from .0015 to .0020 inch. Many 78 R. P. M. records have a groove radius as large as .0030 inch. This difference in groove radius is further complicated by differences in the angle between the groove walls, which commonly varies from 70° to 87°.

Numerous reproducing styli have been proposed which are carefully designed to prevent distortion and provide high fidelity. The differences in such styli being generally confined to the dimensions of the tip radius and included angle as dictated by the shape of groove in which they are designed to track.

Such styli must properly fit their respective grooves. It is well known in the art that a proper fit requires that the stylus must enter the groove and must make contact at two points within the groove. The distance between these two points is known as the diameter of the contact circle.

It is obvious that a single stylus of the prior art cannot properly fit the variety of grooves found in the transcription art alone, much less that found in disc recording generally. A stylus tip having a radius of .002 inch might be well suited to a groove having a radius of .0015 inch, but when used with a groove having a radius of .002 inch the stylus would drag on the bottom of the groove with one point contact causing a high level of surface noise. Furthermore, with the stylus tip radius the same as that of the groove, the introduction of modulation to the groove causes the stylus to rattle around in the bottom of the groove and distort the reproduced signal. As the groove radius becomes larger in respect to the stylus tip the distortion is increased. In addition, it will be seen that if the stylus tip is made large enough to properly fit the larger grooves, it will not enter the smaller grooves.

Early designs of styli calculated to avoid contact with the groove bottom were founded upon groove width. Such styli were given an unusually large tip radius which established contact just below the shoulder of the record groove. In some versions, to avoid shouldering after excessive stylus wear the included angle was made 0° and the sides separated by the dimension of the groove width. These styli were admittedly designed for specific groove widths and lacked the specific parameters required for reproduction from grooves of greater or lesser width. In view of the groove width variation resulting from the lines per inch variation of 96 to 150 incident to modern recording, no single groove width is an acceptable criterion for a universal stylus.

It is therefore an object of this invention to provide a universal stylus for reproducers which fits with two points of contact and a small circle in any record groove from the smallest transcription groove to the largest 78 R. P. M. type record groove.

It is a further object of this invention to provide a universal reproducing stylus having a composite radius of tip.

It is a further object of this invention to provide a universal stylus for reproducers having a first tip radius just larger than the smallest groove radius, a second tip radius superimposed thereon and larger than the largest tip radius, and a third tip radius joining said first and second tip radius and providing a suitable bearing surface for engaging the groove.

Other objects and advantageous of this invention will be apparent from the following description and accompanyng drawings wherein, Fig. 1 is a profile view of a stylus tip constructed according to this invention.

Fig. 2, parts *a*, *b*, *c* and *d*, shows how the stylus of Fig. 1 fits some of the record grooves commonly in use.

Briefly, this invention fills the long felt need for a universal stylus which will reproduce with low distortion from any record groove. To accomplish this the stylus tip is given a first radius of curvature small enough to properly fit the smallest record groove. A second radius of curvature is superimposed on the first, said second radius being greater than the largest groove radius thereby ensuring two point contact with even the largest record groove. A third radius of curvature is superimposed upon the intersection of said first and second radii, the third radius being suitably chosen to provide a smooth contour between the first and second radii and to provide the proper bearing surface between stylus and record groove.

Referring now in Fig. 1 in detail, a preferred embodiment of this invention is shown in profile to illustrate the location of the contour comprising the composite tip radius. The stylus 5 is shown with an included angle of 45°. However, as discussed in detail below, contact with the record is always made with the curved portion of the tip, therefore this dimension is not critical, it being required only that the included angle be somewhat smaller than the smallest groove wall angle. In this embodiment the straight side surfaces 6 of the stylus 5 are tangent to an arc 7 described by a radius 8 of, for example, .002 inch, which represents the first radius of curvature and chosen to properly fit the smallest record groove. Said tangency appears as two points of tangency denoted as U and Z. Below each of said points of tangency and therefore in the region of the .002 inch curvature, the arc 7 is intersected at points between V and W and X and Y by a larger arc 9 described by a radius 10 of, for example, .0035 inch. Said arc 9 represents the second radius of curvature and is chosen so as to be larger than the radius of the largest groove to be tracked. The origins of the radii 8 and 10 are so located along the longitudinal axis of the stylus 5 that the diameter of their intersecting circle is sufficiently less than the width of the smallest groove to permit proper entry of the stylus therein. With the included angle of the side surface 6 known, said location of the origins of radii 8 and 10 also determines the distance from U to V and Y to Z—the first radius off curvature sector. A third arc 11 having a radius of, for example, .0006 inch represents the third radius of curvature and is chosen to give the proper bearing surface at the two points of contact between stylus and groove. Said arc 11 is so located as to be tangent to the arcs 7 and 9 adjacent their intersection. The points of tangency of the arcs 7 and 11 is denoted V and Y, and for the arcs 11 and 9, W and X. The shortest path along the arcs 7, 9 and 11 which join the points of tangency, U and Z is shown by a heavy line UVWXYZ as distinguished from the remainder of the respective arcs which is shown by dotted lines. Said heavy line UVWXYZ indicates the periphery of the tip of stylus 5.

For convenience in referring to the profile view in the drawing, some of the language herein refers to plane geometry. In considering the actual form of this invention as a solid figure, it should be remembered that the respective arcuate surfaces of the tip are spherical. Since the origins of the surfaces generated by radii 8 and 10 both lie on the longitudinal axis of the stylus, the portion of the tip whose external surface is generated by radius 10 may be referred to as a spherical section of radius 10 and the portion of the tip whose surface is generated by radius 8 may be referred to as a spherical segment of radius 8. Similarly, the surface generated by arc 11 tangential to arcs 7 and 9 may, in the solid form of this invention, be considered a toroidal surface.

The distinction between the stylus of this invention and the conventional stylus of .002 inch tip radius may be easily seen in Fig. 1. The conventional stylus is indicated by the sides 6 subtended by the portion of the arc 7 connecting points U and Z. A marked difference in contour and proportion appears between points V and Y. It is this difference that enables the stylus of this invention to fit record grooves of a .002 inch radius or larger with two points of contact and to therefore avoid dragging on the bottom thereof. This feature is clearly shown in Fig. 2.

The parts of Fig. 2 show how the stylus of Fig. 1 fits a variety of groove shapes. Both styli and grooves are shown in cross-section. Although not every groove shape in use has been shown, the examples shown represent the extreme ranges of groove shapes which are encountered.

In detail, Fig. 2*a* shows the stylus 5 of Fig. 1 in a small transcription groove 15 having a radius of curvature of .0015 inch and a wall angle of 87°. It will be noted that a very good fit is provided by this combination, contact with the groove is made in two points yet the stylus enters sufficiently to avoid the shoulders of the groove and provide good tracking.

Fig. 2*b* shows the stylus 5 of Fig. 1 engaging a less popular shape of transcription groove 16 having a radius of curvature of .002 inch and included angle of 70°. It will be noted that the proper fit is also obtained with this groove.

Fig. 2*c* shows the stylus of Fig. 1 engaging a record groove 17 having a radius of curvature of .002 inch and a wall angle of 87°. Again it will be noted that a proper fit is obtained since the stylus tip enters sufficiently into the groove and clears the bottom thereof.

Fig. 2*d* shows the stylus of Fig. 1 engaging a large record groove 18 having a radius of curvature of .003 inch and a wall angle of 87°. Even with this groove shape the stylus 5 makes a proper fit, for although it enters further into this groove than the others, it still makes two point contact for the lower tip radius of the stylus, being .00035 inch, is larger than the radius of the groove and therefore the stylus cannot reach the bottom of the groove.

It may be easily seen by inspection of the various views in Fig. 2 that approximately the same part of the stylus 5 makes contact with each of the grooves 15 through 18. And by comparison with Fig. 1, it will be seen that the contact area is substantially restricted to the areas designated VW and XY, and defined as the intersection of the first and second tip radii with the third tip radius. Therefore, the stylus of this invention engages the complete range of record grooves with a small, distortion minimizing contact circle whose size is substantially the same for all record grooves.

In the application of this invention to many sizes of record grooves, an additional feature should be pointed out which has particular signficance with respect to the larger grooves such as groove 18. To provide a proper fit for this groove it has been necessary to use a large stylus and as a result the circle of contact between stylus and groove will also be large. However, to reproduce with low distortion the contact circle should be small. This is particularly important in playing near the center of the record where the relative groove velocity is low and hence modulation undulations in the groove are too small for a large stylus to follow. But with the stylus of this invention a small contact circle is maintained as well as two point contact even in a large groove as shown in Fig. 2*d*. Therefore said stylus maintains a lower distortion level.

It should be noted that the advantages inherent in the stylus 5 of Fig. 1 are not limited to a stylus made according to the dimensions there shown. For any given range of groove shapes, reproduction standards according to this invention may be had by providing a stylus with a first radius of curvature larger than and large enough to make a proper fit with the smallest groove to be encountered. A second radius of curvature larger than that of the largest groove to be encountered should be superimposed on said first radius of curvature. Said first and second radii should be connected by a third radius tangent to each and providing the proper bearing surface for the stylus against the record. No limitations upon this invention are intended other than may be imposed by the scope of the appended claim.

The invention described herein may be manufactured and used by or for the Government of the United States of America for governmental purposes without the payment of any royalties thereon or therefor.

What is claimed is:

A universal stylus for providing low distortion reproduction with two point contact from any of a range of groove shapes comprising, a conical portion and a tip portion having a complex arcuate surface, said tip portion comprising a spherical sector forming the extreme tip portion and a spherical segment disposed intermediate to the spherical sector and the conical portion, said spherical sector having a radius larger than that of said spherical segment, the relative sizes of said sector and said segment being such that their intersection makes a circle having a diameter whose length is greater than that of the radius of the spherical segment and smaller than that of the radius of the spherical sector.

EDWARD F. McCLAIN, Jr.

REFERENCES CITED

The following references are of record in the file of this patent:

UNITED STATES PATENTS

| Number | Name | Date |
|---|---|---|
| 2,251,204 | Reid | July 29, 1941 |
| 2,310,049 | Albersheim | Feb. 2, 1943 |
| 2,343,417 | Kornei | Mar. 7, 1944 |

FOREIGN PATENTS

| Number | Country | Date |
|---|---|---|
| 358,925 | Great Britain | Oct. 7, 1931 |

OTHER REFERENCES

"Disc Recording," by Howard A. Chinn, Electronic Industries for November 1946, pp. 64 and 66. (Copy in Div. 5.)